(12) United States Patent
Belzowski et al.

(10) Patent No.: US 6,207,207 B1
(45) Date of Patent: *Mar. 27, 2001

(54) COATED CONFECTIONERY HAVING A CRISPY STARCH BASED CENTER AND METHOD OF PREPARATION

(75) Inventors: Marla D. Belzowski, Johnstown, OH (US); David W. Bauman, Waco, TX (US); Keith Schafer, Easton, PA (US); Jennifer L. Reff, Wharton; Carolyn Peucker, Franklin Park, both of NJ (US)

(73) Assignee: Mars, Incorporated, McLean, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,690

(22) Filed: May 1, 1998

(51) Int. Cl.⁷ ................................................ A23G 3/00
(52) U.S. Cl. .................... 426/303; 426/94; 426/289; 426/293; 426/302; 426/304; 426/306; 426/443; 426/447; 426/448; 426/449; 426/450; 426/455; 426/618; 426/808
(58) Field of Search ................................. 426/94, 302, 306, 426/293, 618, 808, 619, 620, 621, 303, 304, 289, 443, 455, 447, 448, 449, 450

(56) References Cited

U.S. PATENT DOCUMENTS

| | | |
|---|---|---|
| 1,473,289 | 12/1923 | Green . |
| 1,485,115 | 2/1924 | Guittard et al. . |
| 2,725,831 | 12/1955 | Zimmer ................................. 107/54 |
| 3,332,784 | 7/1967 | Ellis ........................................ 99/139 |
| 3,470,831 | 10/1969 | von Drachenfrls .................... 107/54 |
| 3,615,676 | * 10/1971 | McKown ............................. 426/293 |
| 3,895,105 | 7/1975 | Colten et al. ........................ 426/306 |
| 3,976,793 | 8/1976 | Olson et al. ........................... 426/96 |
| 4,032,667 | 6/1977 | Kreuter ................................ 426/306 |
| 4,235,939 | 11/1980 | Kimberly, Sr. ...................... 426/549 |
| 4,289,790 | 9/1981 | Bruelle ................................. 426/93 |
| 4,342,787 | 8/1982 | Rebaudieres et al. ............... 426/103 |
| 4,409,250 | * 10/1983 | Van Hulle et al. .................. 426/302 |
| 4,410,552 | 10/1983 | Gaffney et al. ..................... 426/103 |
| 4,567,055 | 1/1986 | Moore ................................. 426/578 |
| 4,873,110 | 10/1989 | Short et al. ......................... 426/621 |
| 4,877,637 | 10/1989 | Harp ................................... 426/634 |
| 4,948,615 | 8/1990 | Zallie et al. ........................ 426/578 |
| 5,147,669 | 9/1992 | Crothers ............................... 426/94 |
| 5,258,199 | 11/1993 | Moore et al. ....................... 426/660 |
| 5,378,481 | 1/1995 | Minamikawa et al. ............... 426/99 |
| 5,385,744 | 1/1995 | Cain et al. ............................ 426/89 |
| 5,413,805 | 5/1995 | Deopierre, III et al. ............ 426/620 |
| 5,500,234 | 3/1996 | Russo ................................. 426/103 |
| 5,709,896 | 1/1998 | Hartigan et al. .................... 426/103 |
| 5,709,902 | * 1/1998 | Bartolomei et al. ................. 426/94 |

FOREIGN PATENT DOCUMENTS

| | | |
|---|---|---|
| 2 031 260 | 4/1980 | (GB) . |
| 95/26637 | 10/1995 | (WO) . |

* cited by examiner

*Primary Examiner*—Milton Cano
(74) *Attorney, Agent, or Firm*—Fitzpatrick, Cella, Harper & Scinto

(57) ABSTRACT

A coated confectionery having a crispy starch based center with a thin continuous rigid outer, coating is disclosed. The integrity of the thin continuous rigid outer coating is maintained even after prolonged storage. Also disclosed is a method for preparing such coated confectionery.

21 Claims, 2 Drawing Sheets

COATED CONFECTIONERY HAVING A CRISPY STARCH BASED CENTER AND METHOD OF PREPARATION

BACKGROUND OF THE INVENTION

1. Field of the Invention

This invention is related to a coated confectionery having a crispy starch based center with a thin rigid outer coating which is preferably a sugar shell coating. The coated confectionery of this invention is highly shelf-stable, particularly since the thin rigid outer shell maintains its integrity even after lengthy storage. The invention further relates to a conditioned crispy starch based center. The starch based center of this invention may be comprised of flour, kernels, grain or starch from any starch source. The invention also relates to the method of preparing the coated confectionery of this invention and the conditioned crispy starch based center.

2. Related Background Art

Coated confectionery, and particularly sugar shelled confectionery, have long been known. For example, the extremely well known M&M® chocolate candies are chocolate centers having sugar shell coatings. Other examples include Nestle's Smarties®, Hershey's Reeses Pieces® and the like.

The preparation of coated confectioneries having a crispy starch based center with a thin rigid outer sugar shell presents several technical hurdles that must be overcome to ensure a product having excellent quality. First, the center cannot be soggy. In addition, cracking of the outer shell must be avoided to prevent premature staling of the product. Confectioneries having crispy starch based centers and thin sugar shell coatings are known, but have not avoided these problems.

U.S. Pat. No. 4,342,787 describes a dessert preparation including a chocolate coated crisp puffed rice cereal combined with a dessert based powder. It is said that the chocolate coating protects the rice cereal from becoming soggy after the dessert preparation is mixed with water or milk. There is no disclosure or suggestion of conditioning the rice cereal or of coating the rice cereal with a rigid sugar shell coating.

A coated confectionery having a crispy starch based center with a thin rigid outer coating which does not crack even after prolonged periods of storage would be highly desirous.

SUMMARY OF THE INVENTION

This invention is directed to a sugar coated confectionery having a crispy starch based center and a thin and continuous rigid outer sugar coating. Significantly, the integrity of the thin rigid outer sugar coating or sugar shell is maintained even after prolonged periods of storage. The thin sugar coating generally has a thickness of about 0.001 mm to about 2 mm, more preferably about 0.3 mm to about 0.7 mm. Preferably, the sugar coating is a high quality sugar shell that is smooth and glossy. The sugar coated confectionery of this invention comprises:

(a) a crispy starch based center having a water activity (Aw) which minimizes volumetric expansion of the crispy starch based center after application of the thin rigid outer sugar coating;
(b) an optional, but preferable, chocolate layer covering the crispy starch based center; and
(c) the rigid outer sugar coating.

The invention is also directed to a method for preparing a coated confectionery having a crispy starch based center with a thin rigid outer coating. The method comprises the steps of: (a) forming a starch based center; (b) drying the starch based center; (c) rehumidifying the dried starch based center to provide a crispy starch based center having an Aw which minimizes volumetric expansion of the crispy starch based center after application of the thin rigid outer coating to the confectionery due to adsorption of moisture by the crispy starch based center; and (d) applying the thin rigid outer coating that surrounds the crispy starch based center. The thin rigid outer coating is any hard candy continuous thin shell that is not highly permeable to moisture and generally is a sugar shell coating. In a preferable embodiment of this invention a chocolate layer is applied to the crispy starch based center prior to application of the thin rigid outer coating. Yet another embodiment of the invention is directed to the conditioned crispy starch based center employed in the above-described coated confectionery and the method of producing the same.

DETAILED DESCRIPTION OF THE INVENTION

Figure 1:
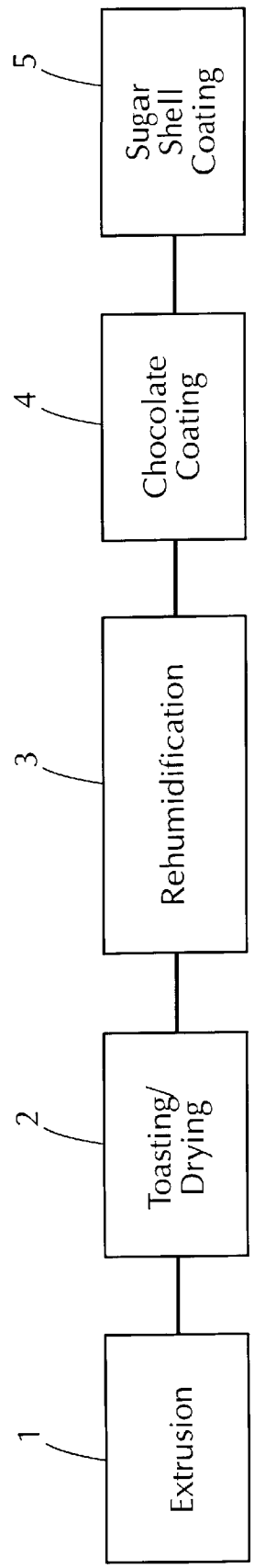
FIG. 1 is a process diagram of a preferred embodiment of the method of this invention.

The coated confectionery of this invention has a crispy starch based center. Generally the starch based center is comprised of a flour, grain, kernel or starch selected from the group consisting of rice, corn, wheat, potato, sweet potato, sago, waxy maize, sorghum, millet, tapioca, soy bean and mixtures thereof. The starch based center is preferably puffed or expanded. This may be achieved, for example and without limitation, by extrusion, gun puffing or vacuum oven expansion techniques. Preferably, extrusion is employed. The starch based center generally has a spherical, oval or lentil shape. The starch based center, however, may also take the form, for example, of hearts, eggs, triangles, squares or other geometric and/or novelty shapes as desired.

The starch based center of this invention may include monosaccharides and/or disaccharides such as, for example, dextrose, fructose, xylose and/or sucrose. Flavor agents, both natural and artificial, may also be included in the starch based center. Such flavors include for example, toasted rice flavor, natural malt flavor, fruit flavors and like. Other additives, such as vitamins, minerals, fats, oils, and preservatives may also be included in the starch based center as desired. The starch based center may also include conventional inclusions such as fruit pieces, chocolate pieces, peanut pieces and the like.

Generally, the flour, grain, kernel or starch component of the starch based center is present in an amount of about 30% to about 100%, preferably about 50% to about 95% and most preferably 75% to about 90% by weight of the starch based center. The starch based center may also include a disaccharide such as sucrose in an amount of about 0.5% to about 50% by weight of the center. If a monosaccharide such as dextrose is present, it will generally be in an amount of about 0.5% to about 25% by weight of the starch based center. If desired, other additives, such as salt or flavors, may be present in minor amounts up to about 10% by weight of the center.

A significant aspect of the present invention is the water activity (Aw) of the starch based center. The Aw of the starch based center must be controlled to avoid soggy centers and cracking of the rigid outer shell of the confectionery. It has been discovered that the Aw of the center used in the coated confectionery of this invention should be in a range that is at equilibrium with the Aw of the entire confection after storage for a period of time, i.e., when the Aw gradient across the entire confection has been substantially minimized. Without being bound to theory, it is believed that when at this equilibrium state the center does not draw water from the surrounding layers including the outer shell which would cause expansion of the center and shell cracking. In addition the center cannot be so moist that it becomes soggy since this would clearly be an unacceptable product when trying to produce a confectionery having a crispy center.

The Aw of the crispy center that is in equilibrium with the surrounding coating(s) will vary depending on the composition of the thin crispy center, optional chocolate coating and rigid outer coating. Once the composition of the confectionery is set, the appropriate Aw for the crispy center can be readily determined by preparing several coated confectioneries each having a different Aw and observing the completed confectionery to determine if the rigid coating cracks over a period of time. A range of Aw can be determined that provides a coated confectionery free of cracking. It is preferable, however, to use the minimum Aw that avoids cracking.

A particularly preferred crispy starch based center of this invention is a crispy rice center that is expanded or puffed by extrusion. The crispy rice center used in the coated confectionery of this invention will typically have an Aw greater than about 0.30 prior to application of the outer coating. Preferably, the precoat Aw of the crispy rice center is in a range of about 0.31 to about 0.46, more preferably in a range of about 0.33 to about 0.40.

The coated confectionery of this invention may include a chocolate layer disposed between the crispy starch based center and the sugar shell coating. Preferably the coated confectionery of this invention includes such a chocolate layer. The weight ratio of the chocolate layer to crispy center will generally be in a range of 0.5:1 to about 15:1, more preferably about 3:1 to about 6:1.

Chocolate used in foods in the United States is subject to a standard of identity established by the U.S. Food and Drug Administration under the Federal Food, Drug and Cosmetic Act that sets out the requisite ingredients, and proportions thereof, of a confection to permit labelling of the confection as a "chocolate." The most popular chocolate or chocolate candy consumed in the United States is in the form of sweet chocolate or milk chocolate. Chocolate is essentially a mixture of non-fat solids, including cocoa solids, suspended in fat. Milk chocolate is a confection which contains non-fat milk solids, milk fat, chocolate liquor, a nutritive carbohydrate sweetener, cocoa butter and may include a variety of other ingredients such as emulsifying agents, flavorings and other additives. Sweet chocolate contains higher amounts of chocolate liquor, but lower amounts of milk solids than milk chocolate. Semisweet chocolate requires at least 35% by weight chocolate liquor and is otherwise similar in definition to sweet chocolate. Dark chocolate, generally containing only chocolate liquor, a nutritive carbohydrate sweetener and cocoa butter, is by definition either a sweet chocolate or a semisweet chocolate. Buttermilk chocolate and skim milk chocolate differ from milk chocolate in that the milk fat comes from various forms of sweet cream buttermilk and skim milk, respectively. Skim milk requires the total amount of milk fat to be limited to less than the minimum for milk chocolate. Mixed dairy product chocolates differ from milk chocolate in that the milk solid includes any or all of the milk solids listed for milk chocolate, buttermilk chocolate or skim milk chocolate. White chocolate differs from milk chocolate in that it contains no non-fat cocoa solids. Non-standardized chocolates are those chocolates which have compositions which fall outside the specified ranges of the standardized chocolates. Chocolates are classified as "non-standardized" chocolates when a specified ingredient is replaced, either partially or completely, such as when the ingredient cocoa butter is replaced with vegetable oils or fats. Any additions or deletions to a chocolate recipe made outside the U.S. FDA standards of identity for chocolate will prohibit use of the term "chocolate" to describe the confectionery. However, as used herein, the term "chocolate" refers to any standard of identity or non-standard of identity chocolate.

Other intermediate layers besides chocolate may be employed in the coated confectionery of this invention. Such intermediate layers include peanut butter, peanut paste, butters or pastes of other nut meats and the like. The coated confectionery may also include multiple intermediate layers, e.g., chocolate and peanut butter, as desired.

The coated confectionery of this invention also comprises a thin continuous rigid outer sugar coating. The rigid coating is a hard coating that is relatively impermeable to moisture. A particularly preferred rigid outer coating is a sugar shell coating. The sugar shell coating is comprised of crystalline sugar. The preferred sugar shell coating is a thin high quality continuous shell that is smooth and glossy. In addition, the sugar shell coating can comprise colorants, flavorants and the like. Generally, the weight ratio of the rigid outer sugar coating is about 5 to about 40 percent by weight of the confectionery and preferably about 13 to about 38 percent by weight of the confectionery.

Another embodiment of this invention is directed to a method of preparing a coated confectionery having a crispy starch based center and a rigid outer coating. The coated confectionery prepared by the method of this invention are substantially free of spontaneous cracking of the rigid outer coating due to volumetric expansion of the center after application of the outer coating.

The formation of the starch based center may be performed in any way desirable, but most preferably is done using a cooker/extruder. Cooker/extruders are well known for use in food preparation. Using a cooker/extruder provides a preferable means of puffing or expanding the starch based center. The feed rates, barrel temperatures, screw speed, torque and pressure of the extruder will vary depending on the composition of the center and the desired texture of the crispy center. A die is chosen for use with the extruder having a hole size and shape that will depend on the size and shape of the center desired. The extruded product is then chopped to a desired size as it exits the extruder. In a preferred embodiment of this invention the centers have a spherical or lentil shape with a diameter (major axis for a lentil) of about 50.0 mm to about 2.5 mm, preferably about 20.0 mm to about 5 mm, and more preferably from about 10.4 mm to about 10 mm. If a lentil shape, the diameter is measured across the major axis of the center and the thickness of the center is measured across the minor axis. The thickness (minor axis for a lentil) will generally range from about 45 mm to about 2.5 mm, preferably about 10 mm to about 4 mm and more preferably from about 6.4 mm to about 6.0 mm. In a particularly preferred embodiment of this invention the starch used in the cooker extruder is a rice flour. In this case, the resulting extruded center generally has a moisture content of about 4 to about 40 percent, preferably about 8 to about 11 percent by weight. This extruded center will generally weigh in the range of about 0.07 to about 2.0 grams, preferably about 0.09 to 1.5 grams and most preferably about 0.11 to about 0.13 grams.

After extrusion, the center is preferably dried or toasted to reduce the moisture level of the center to help develop toasted flavor and crispness of the center. The drying step can be performed in any manner desirable. A particularly preferred means of drying the center is in a fluidized bed oven. The temperature, air velocity and residence time in such an oven can readily be determined by those of ordinary skill in the art and is dependent, of course, on the product composition and desired product texture and taste. In a preferred embodiment of this invention employing a rice flour center, the moisture level of the center is reduced to a range of about 0.8% to about 12%, more preferably about 1% to about 6%, most preferably about 1% to about 2.0%.

A highly significant aspect of this invention is the step of rehumidification of the starch based center. As previously noted, the appropriate range of Aw for the crispy center prior to coating may readily be determined by preparing a number of the desired coated confectionery with each having a different Aw and observing the incidence of shell cracking, if any, over a set period of time. Once the desired Aw has been determined, then the starch based center is conditioned to provide the desired Aw by rehumidification, i.e., the addition of water to the center.

Water activity (Aw) may readily be determined using Aw measuring instruments such as a "HYGROSKOP DT" available from Rotronic Instrument Corp., Huntington, N.Y. Using a "HYGROSKOP DT", Aw results may be readily obtained 15 to 30 minutes after placing the sample in the sample chamber of the instrument.

The crispy centers used in the method of this invention may be rehumidified by exposure to a relative humidity (Rh) between about 35 Rh and about 75 Rh at a temperature between about 30° C. to about 70° C. for a time effective to provide a crispy center having a desired Aw. This step of rehumidification can be a batch process or a continuous process. A continuous process is preferred. The actual humidity, temperature, air flow and time that are used to condition the center can be readily determined by one of ordinary skill in art by simply varying the conditioning parameters and calculating the resulting Aw. A typical means of conditioning the centers is a steam heated oven having a belt moving through the oven.

Figure 2:
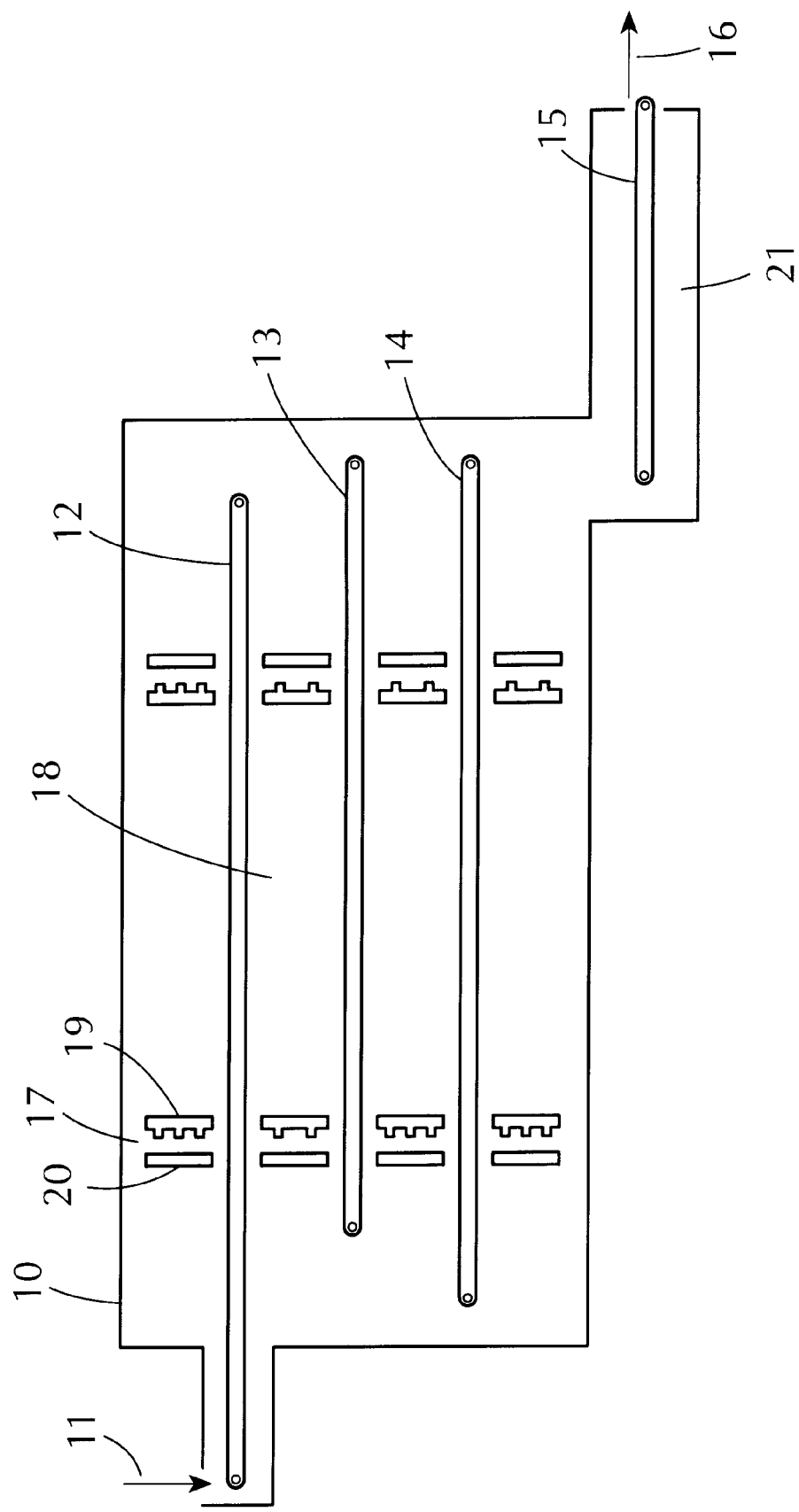
FIG. 2 is a schematic view of a preferred rehumidifier used in the method of this invention.

FIG. 2 illustrates a preferred rehumidification device used in the process of this invention. The dried starch based centers are introduced to the rehumidifier 10 at product inlet 11 onto a first movable belt 12. The centers are conveyed on the first movable belt 12 until dropping onto the second movable belt 13. The centers are they conveyed on the second movable belt 13 until dropping onto third movable belt 14 and after conveyance thereon are deposited onto fourth movable belt 15. The fourth movable belt 15 conveys the product to the product outlet 16. Moisturized air is supplied to the rehumidifier chamber 18 via spray nozzles 17 having a treated water supply 19 which is directed onto steam heated coils 20. The rehumidifier chamber is provided with baffles (not shown) which protect the product from direct contact with the water spray. The moisturized air is circulated about the rehumidifier chamber 18 via circulation fans (not shown) and heated to a desired temperature by the steam heated coils 20. After rehumidification, the centers are preferably passed through cooling chamber 21 prior to exiting the rehumidifier.

In a preferred embodiment of this invention, i.e., when using a crispy rice flour center, the oven temperature of the above described rehumidifier is set between 40° C. to 65° C., most preferably about 50° C. to about 55° C., the relative humidity (Rh) is maintained between about 40 Rh to about 65 Rh, most preferably about 55 Rh to about 60 Rh and the air speed is set to ensure that the centers remain on the moving belts. In such a conditioning system it has been found that rice flour centers need only about a 75 minutes in the conditioning zone. Once conditioned, the Aw of the crispy starch based centers of this invention are quite stable.

After conditioning to the proper Aw, the crispy starch based centers may be coated with chocolate. The application of chocolate is well known to those skilled in the art and can readily be applied by dipping, panning, spraying and the like. An example of an apparatus useful for chocolate spraying is descried in U.S. Pat. No. 5,010,838, the disclosure of which is incorporated by reference herein. Chocolate panning is described by Minifie, B. W., "Chocolate, Cocoa, and Confectionery," 3rd edition, pp. 221–225 (1989), the disclosure of which is incorporated by reference herein.

The step of applying a thin rigid outer coating to a confectionery is also well known. It is conventional to coat edible centers with one or more layers of sugar coating by using a drum or a rotatable vessel and warm air, which may be humidity controlled, or other gas to evaporate a sugar syrup and harden each layer of sugar coating. Such conventional hard panning is described, for example, in U.S. Pat. No. 5,495,418, by Minifie, B. W., "Chocolate, Cocoa, and Confectionery", 3rd edition, pp. 506, 608 (1989) and by Beckett, S. T., "Industrial Chocolate Manufacture and Use", 2nd edition, pp. 239–240 (1994) the disclosures of each of which are incorporated by reference herein. Typically, the sugar syrup used to form the thin continuous rigid shell will have about 40 to about 85 percent solids. Such sugar syrups may be comprised of sucrose, corn syrup, gums and the like. As noted previously, the sugar shell may also contain colorants and/or flavorants as desired.

Yet another embodiment of this invention is directed to a method for preparing a conditioned crispy starch based center comprising the steps of: (a) extruding a starch based composition to form a starch based center; (b) drying said starch based center to form a crispy starch based center; and (c) rehumidifying said crispy starch based center at a relative humidity, temperature and time to form a conditioned crispy starch based center having an Aw within a previously defined range. The starch based composition may be comprised of any of the starch components previously described, i.e., flour, kernel, grain or starch from any starch source. The steps of extrusion, drying and rehumidifying may be performed in the manner set forth herein in describing the preparation of the coated confectionery of this invention. The previously defined range of Aw is that range of Aw which is determined to be at equilibrium with the entire confection after a period of storage, i.e. the period required to substantially minimize the Aw gradient of the confection. In this embodiment of the invention, preferably the die temperature of the extruder is in a range of about 125° C. to about 170° C., preferably about 160° C. to about 170° C., and the die pressure of the extruder is about 700 psi to about 1500 psi, preferably about 1000 psi to about 1040 psi.

A further embodiment of this invention is directed to the conditioned crispy starch based center prepared by the method described above. Such centers are particularly preferred for use in the coated confectionery of this invention.

The Examples which follow are intended as an illustration of certain preferred embodiments of the invention, and no limitation of the invention is implied.

EXAMPLE 1

A crispy starch based center was prepared by first preparing a dry mix of 87% w/w rice flour, 7% w/w sucrose, 3% w/w flavor, 2% w/w salt and 1% w/w dextrose. The dry mix was fed to a Werner & Pfleiderer Zsk 57 twin screw cooker extruder available from Werner & Pfleiderer Corp., Ramsey, N.J. A mixture of water and malt extract was then metered into the extruder having a die temperature of 157° C. and a die pressure of about 1000–1020 psi. As the extruded puffed rice emerged from the extruder it was cut by a high speed rotating knife to form extruded puffed rice centers weighing about 0.13 g and having about 9% by weight moisture.

The extruded puffed rice centers were then dried and toasted in a gas heated, convection, belt dryer (available from Proctor & Schwartz, Philadelphia, Pa.) for about 6 minutes at a temperature ranging from about 112° C. to about 120° C. The dried centers had a moisture content of about 1 to 1.3% by weight.

The dried centers were then conditioned in an Envirotronics cabinet (available from Envirotronics Inc., Grand Rapids, Mich.) for 12 hours at 55 Rh and 45° C. The rehumidified centers had an Aw of 0.34 measured with a "HYGROSKOP DT" (available from Rotronic Instrument Corp., Huntington, N.Y.) and a moisture of 6–8% by weight. The conditioned centers were cooled to room temperature.

Next, the conditioned centers were sprayed with chocolate to provide a layer of chocolate having a chocolate to center weight ratio of about 5:1. The chocolate coated crispy rice centers were then coated with a conventional sugar shell in an amount of about 20% by weight of the coated confectionery. Even after 47 weeks there was no evidence of spontaneous shell cracking.

EXAMPLE 2

A sugar shell coated confectionery having a crispy rice center and an intermediate chocolate layer was prepared in a manner similar to Example 1, with the exception that the drying and rehumidification steps were altered. First, the extruded puffed centers were dried and toasted in a fluidized bed toasting/drying oven (a Wolverine Jetzone Cooler available form the Wolverine Corp., Boston, Mass.) for about 3.5 minutes at a temperature of about 157° C. to about 171° C. The rehumidification conditioning step was performed on a multi-pass dryer (Food Engineering Corp., Minneapolis, Minn.) that had been converted to a rehumidification system as described in FIG. 2 by the addition of a water spray system to the air supply and recirculation zones. The centers were rehumidified in this system for about 75 minutes. The resulting centers had a moisture level of about 7.5% by weight and an AW of 0.36. After application of the chocolate and sugar shell coating, the resulting coated confectionery displayed no spontaneous cracking even after 47 weeks.

COMPARATIVE EXAMPLE 1

A sugar shell coated confectionery having a crispy rice center and an intermediate chocolate layer was made in the manner described in Example 1, with the exception that the dried crispy center was only conditioned to an Aw of 0.29. After 22 weeks spontaneous cracking was observed in the sugar shell.

Other variations and modifications of this invention will be obvious to those skilled in this art. This invention is not to be limited except as set forth in the following claims.

What is claimed is:

1. A method for preparing a coated confectionery having a crispy starch based center, with a continuous hard panned outer sugar shell coating, said method comprising the steps of:

(a) forming a starch based center;

(b) drying said starch based center to form a crispy starch based center;

(c) rehumidifying said crispy starch based center to provide said crispy starch based center with a water activity which minimizes cracking of said sugar shell due to volumetric expansion of said crispy starch based center after application of said continuous outer sugar shell coating surrounding said crispy starch based center, wherein said water activity is greater than about 0.30; and (d) applying said continuous outer hard panned sugar shell coating that surrounds said crispy starch based center, wherein said step of applying includes the application of successive layers of sucrose syrup by hard panning.

2. A method according to claim 1, wherein said starch based center is comprised of a flour, kernel, grain or starch selected from the group consisting of rice, corn, wheat, potato, sweet potato, sago, waxy maize, sorghum, millet, tapioca, soy bean and mixtures thereof.

3. A method according to claim 2, wherein said starch based center is extruded.

4. A method according to claim 3, further comprising the step of applying a chocolate layer to said crispy starch based center prior to application of said continuous outer sugar shell coating.

5. A method according to claim 4, wherein said starch based center further comprises monosaccharides, disaccharides or mixtures thereof.

6. A method according to claim 1, wherein said starch based center further comprises flavor agents.

7. A method according to claim 6, wherein said flavor agents are selected from the group consisting of toasted rice flavor, natural malt flavor and mixtures thereof.

8. A method according to claim 5, wherein said starch based center is a rice flour center including sucrose and dextrose.

9. A method according to claim 8, wherein said extruded starch based center has a moisture level of about 4 to about 40 percent by weight.

10. A method according to claim 9, wherein the step of drying said starch based center reduces the moisture of said starch based center to a range of about 0.8 to about 12 percent weight.

11. A method according to claim 10, wherein the dried starch based center is exposed to a relative humidity between 35 and 75 at a temperature between 30° C. to 70° C. to provide a crispy rice flour center having a water activity greater than about 0.30.

12. A method according to claim 11, wherein the water activity of said crispy rice flour center is in a range of about 0.31 to about 0.46.

13. A method according to claim 12, wherein the water activity of said crispy rice flour center is in a range of about 0.33 to about 0.40.

14. A method according to claim 1, wherein said rehumidification step is a continuous process.

15. A method for preparing a water activity conditioned crispy starch based center comprising the steps of:

(a) extruding a starch based composition to form an expanded starch based center;

(b) drying said starch based center to form a crispy starch based center; and (c) rehumidifying said crispy starch based center at a relative humidity, temperature and time to form a water activity conditioned crispy starch based center having a water activity greater than about 0.30.

16. A method according to claim 15, wherein said starch based composition comprises a flour, kernel, grain or starch selected from the group consisting of rice, corn, wheat, potato, sweet potato, sago, waxy maize, sorghum, millet, tapioca, soy bean and mixtures thereof.

17. A method according to claim 16, wherein said flour is rice flour.

18. A method according to claim 17, wherein the starch based composition is extruded at a die temperature in a range of about 125° C. to about 170° C. and a die pressure of about 700 psi to about 1500 psi.

19. A method according to claim 18, wherein said starch based centers are dried at a temperature and time effective to reduce the moisture content of the centers to a range of about 0.8 to about 12 percent by weight.

20. A method according to claim 19, wherein said relative humidity is in a range between about 35 Rh and about 75 Rh and a temperature between about 30° C. and about 70° C.

21. A method according to claim 20, wherein said water activity of said conditioned crispy rice flour center is in a range of about 0.31 to about 0.42.

* * * * *

UNITED STATES PATENT AND TRADEMARK OFFICE
CERTIFICATE OF CORRECTION

PATENT NO. : 6,207,207 B1
DATED : March 27, 2001
INVENTOR(S) : Maria D. Belzowski et al.

It is certified that error appears in the above-identified patent and that said Letters Patent is hereby corrected as shown below:

Title page,
Item [56], References Cited, U.S PATENT DOCUMENTS,
  "1,473,289   12/1923   Green" should read
  -- 1,473,289   11/1923   Green --;
"von Drachenfrls" should read -- von Drachenfels --; and
"Deopierre, III et al." should read -- Delpierre, III et al. --; and Item [57], ABSTRACT,
Line 2, "outer," should read -- outer --.

Column 2,
Line 17, "Yet" should read -- ¶Yet --.

Signed and Sealed this

Ninth Day of April, 2002

Attest:

JAMES E. ROGAN
*Attesting Officer*   *Director of the United States Patent and Trademark Office*